United States Patent [19]
Suva et al.

[11] 3,922,091
[45] Nov. 25, 1975

[54] AUTOMATIC DRAFT COMPENSATING CIRCUIT FOR DIGITAL SPECTROPHOTOMETER

[75] Inventors: Tito Suva, Geneva; Manuel C. Sanz, Grand Lancy, both of Switzerland

[73] Assignee: Micromedic Systems, Inc., Philadelphia, Pa.

[22] Filed: Apr. 30, 1973

[21] Appl. No.: 355,827

[30] Foreign Application Priority Data
Apr. 28, 1972  Switzerland.................... 6418/72

[52] U.S. Cl.................... 356/93; 23/253 R; 356/95; 356/97
[51] Int. Cl.²............................................ G01J 3/42
[58] Field of Search............ 356/88, 93, 95, 96, 97, 356/98, 226; 23/253 R

[56] References Cited
UNITED STATES PATENTS
3,522,739   8/1970   Coor et al..................... 356/97
3,646,331   2/1972   Lord........................... 356/96
3,724,954   4/1973   Dreyfoos, Jr.................. 356/226

FOREIGN PATENTS OR APPLICATIONS
1,174,982   12/1969   United Kingdom
1,182,137   2/1970    United Kingdom
1,185,018   3/1970    United Kingdom
1,191,731   5/1970    United Kingdom
1,232,092   5/1971    United Kingdom
1,261,735   1/1972    United Kingdom

*Primary Examiner*—Vincent P. McGraw
*Attorney, Agent, or Firm*—Seidel, Gonda & Goldhammer

[57]   ABSTRACT

The digital output of a spectrophotometer is multiplied by a factor to correct for drift in the absorbence of a sample standard. The value of the factor is determined by comparing a standard sample which has undergone drift against a preset value stored in the drift correction circuit. Circuitry is provided to accumulate the amount of drift correction and sound an alarm if it exceeds a predetermined value.

13 Claims, 7 Drawing Figures

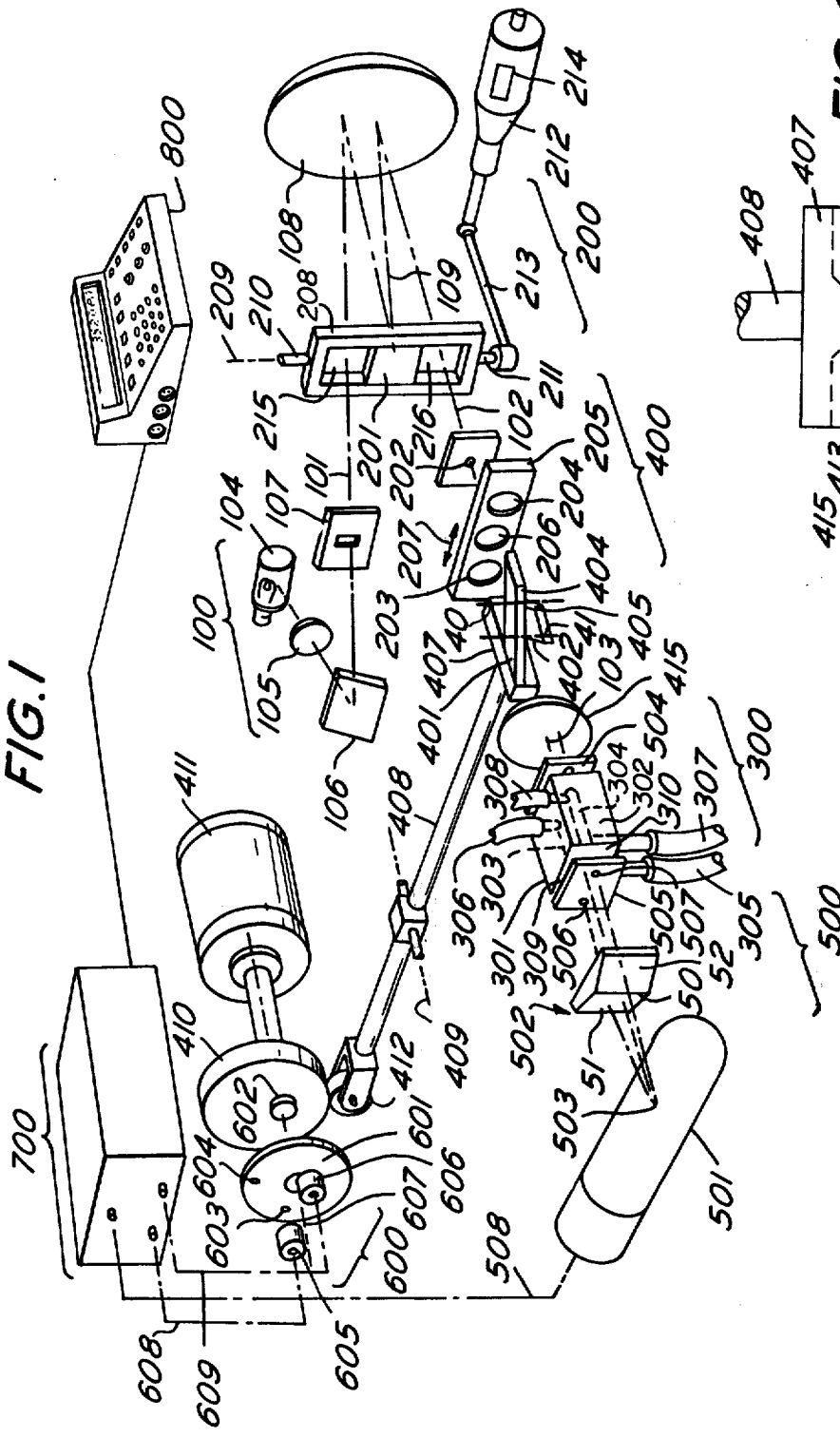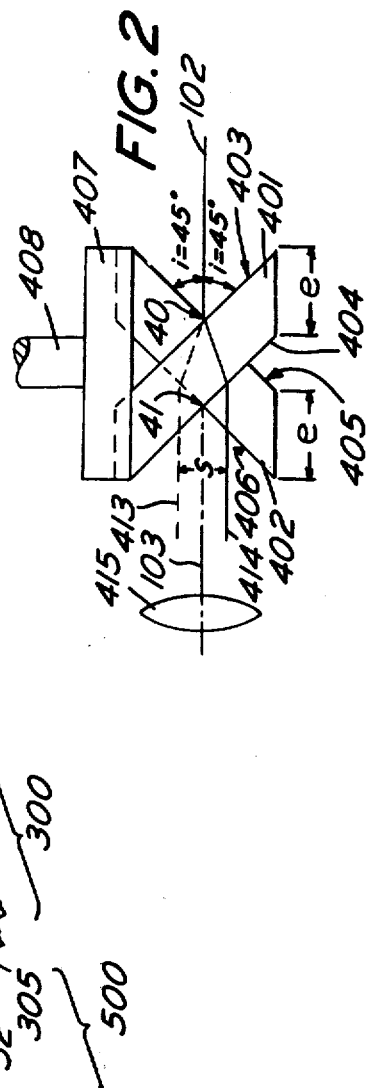
FIG.1
FIG.2

FIG.4
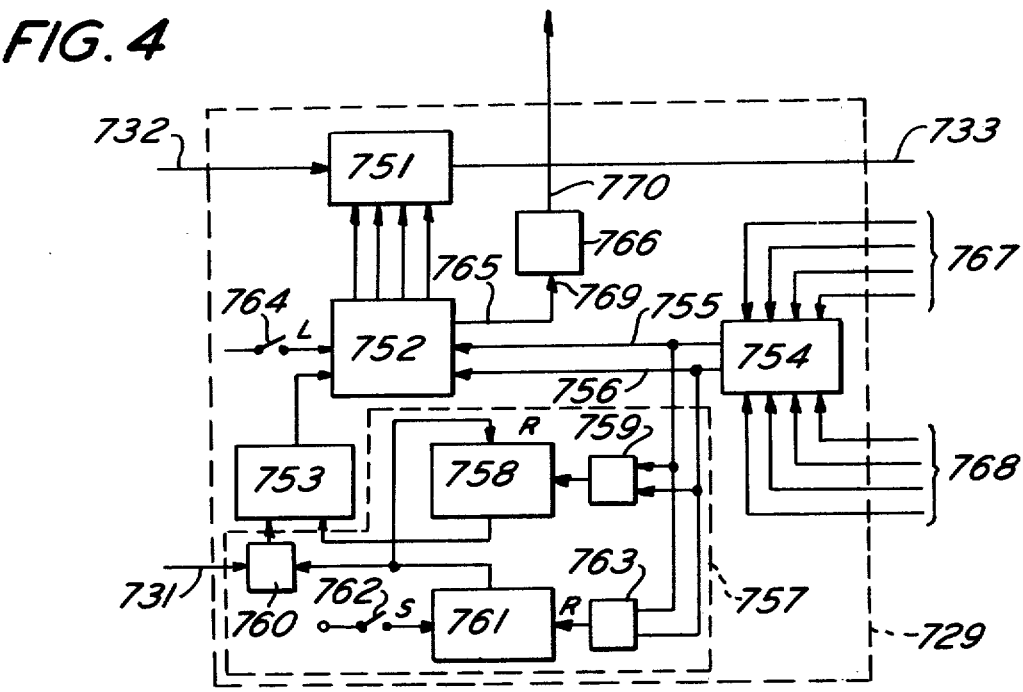
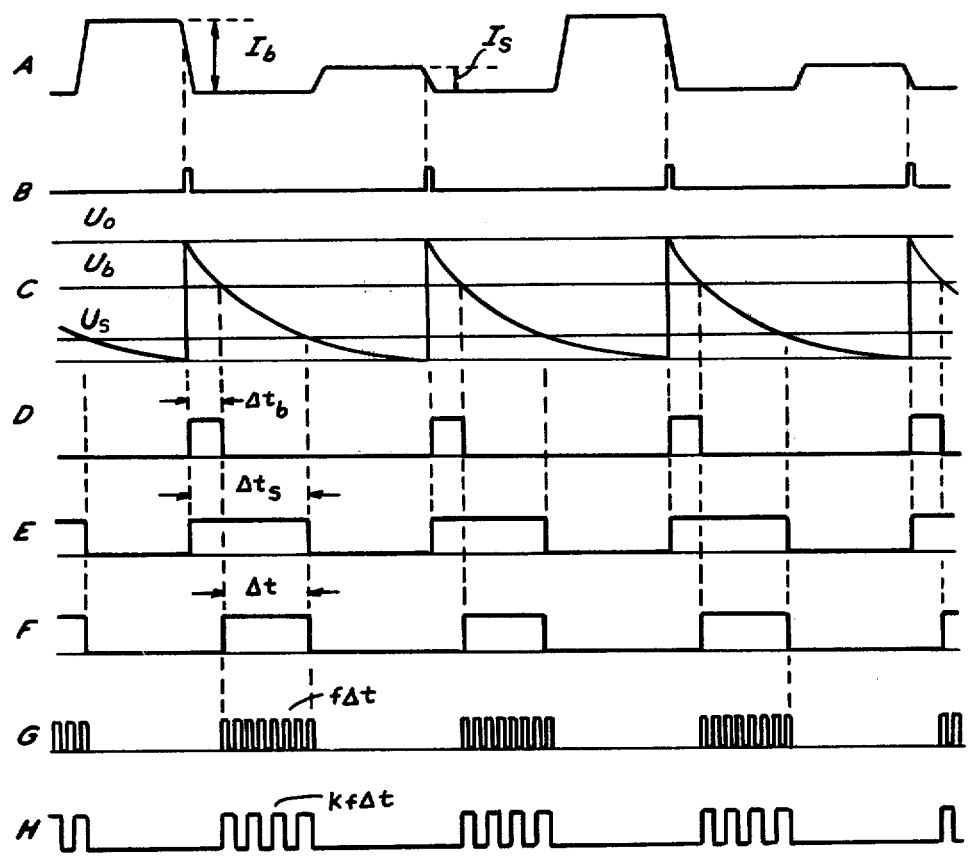
FIG.7

AUTOMATIC DRAFT COMPENSATING CIRCUIT FOR DIGITAL SPECTROPHOTOMETER

This invention relates to an improved spectrophotometric apparatus; and more particularly, to an automatic drift compensating circuit for a digital spectrophotometer.

Spectrophotometric determination of absorbence or concentration is a well-known chemical procedure. Spectrophotometers are used to measure the transmission of a monochromatic beam through a substance, and to calculate the concentration of a solute when the substance is a solution. Spectrophotometers usually operate upon fluid substances (primarily liquids) but they are not so limited.

Spectrophotometers are often used as part of a series of apparatus making repetitive operations upon a particular type of substance. For example, hospitals, clinics and medical laboratories often make series of analytic tests upon a particular type of substance such as urine or blood. Frequently, the spectrophotometer is the last instrument used in the series of operations upon such substances. A problem that arises is that some substances such as reactives used along the analytical chain may undergo chemical or other changes during the time period before the series of analytic tests begin and also during the test. As a result, the absorbence of the sample may differ at the time of measurement from its value when first derived and the amount of such difference may be critical to the validity of the analysis being made. This change in absorbence is drift. It can be the result of the variations of one or more parameters affecting the chemical reaction.

It is evident that the concentration value determined by the spectrophotometer will be in error unless the instrument can correct for such drift. The present invention provides such a correction capability for a spectrophotometer. Thus, the apparatus adjusts the output of the spectrophotometric instrument to correct for errors due to drift. It is particularly useful for correcting chemical drift which occurs during the series of tests upon the substance since this type of chemical drift is readily known, measured and controlled.

There usually is a point where the amount of drift is so extensive that the spectrophotometric test losses all credibility. The present invention therefore provides an apparatus which senses the total amount of drift relative to a standard and provides an alarm when it reaches a preset limit. The drift compensating circuit determines the amount of compensation made each time the drift of a standard substance is corrected to a preselected standard value. This amount can be summed with the amount of preceding corrections. In this way, a series of small corrections which always have the same sense can be noted. This might indicate a disturbance somewhere in the test system requiring a check of the operations preceding the final measurement. On the other hand, the drift compensating circuit will merely correct the spectrophotometer for drift of moderate value.

Thus, the purpose of this invention is to provide a drift compensating apparatus to adjust the output of a spectrophotometer so as to base such output upon a previously selected standard value, and to keep a record of the amount of correction needed to obtain that goal. The apparatus also provides an alarm when this amount becomes greater than a preset limit.

As hereinafter described, a spectrophotometer provides a digital output proportional to the actual measured absorbence of the sample. This output is corrected for drift by multiplying it by a variable factor that depends upon the amount of drift. The value of the standard against which drift corrections are made is stored in a memory. This standard value is compared by a digital comparator against the multiplied value and the resultant difference is used to vary the multiplying factor, increasing it or decreasing it depending upon the result of the comparison.

The correction is performed in steps. A special strategy is used to reduce the number of steps and hence the time for drift correction. First, a correction is made in the multiplying factor. Then a comparison determines whether inequality still remains between the standard value and the multiplied value. If it does, then another correction step is made. Then yet another comparison is made. Each time the sign of the inequality changes as determined by the comparison, the amount of correction is reduced. When equality is reached, the drift correction procedure is stopped. The foregoing is accomplished using the apparatus and circuitry hereinafter described.

The invention is described hereinafter with specific reference to correcting for chemical drift. It should be understood, however, that this is for purposes of exemplification, not limitation, and that the invention is applicable to correcting other types of drift. Thus, if for any reason, when the standard sample is in the spectrophotometer, the instrument reading does not correspond to the known value for that sample, the hereinafter described electronic circuit may be used to correct for the drift.

For the purpose of illustrating the invention, there are shown in the drawings forms which are presently preferred; it being understood, however, that this invention is not limited to the precise arrangements and instrumentalities shown.

FIG. 1 is a diagrammatic perspective view of a shifted beam spectrophotometer.

FIG. 2 is a plan view of a part of the light beam shifting apparatus.

FIG. 4 is a block diagram of the drift correcting circuit.

FIG. 7 is a series of graphs showing the wave forms of various circuit elements necessary to the explanation of this invention.

Figure 3:
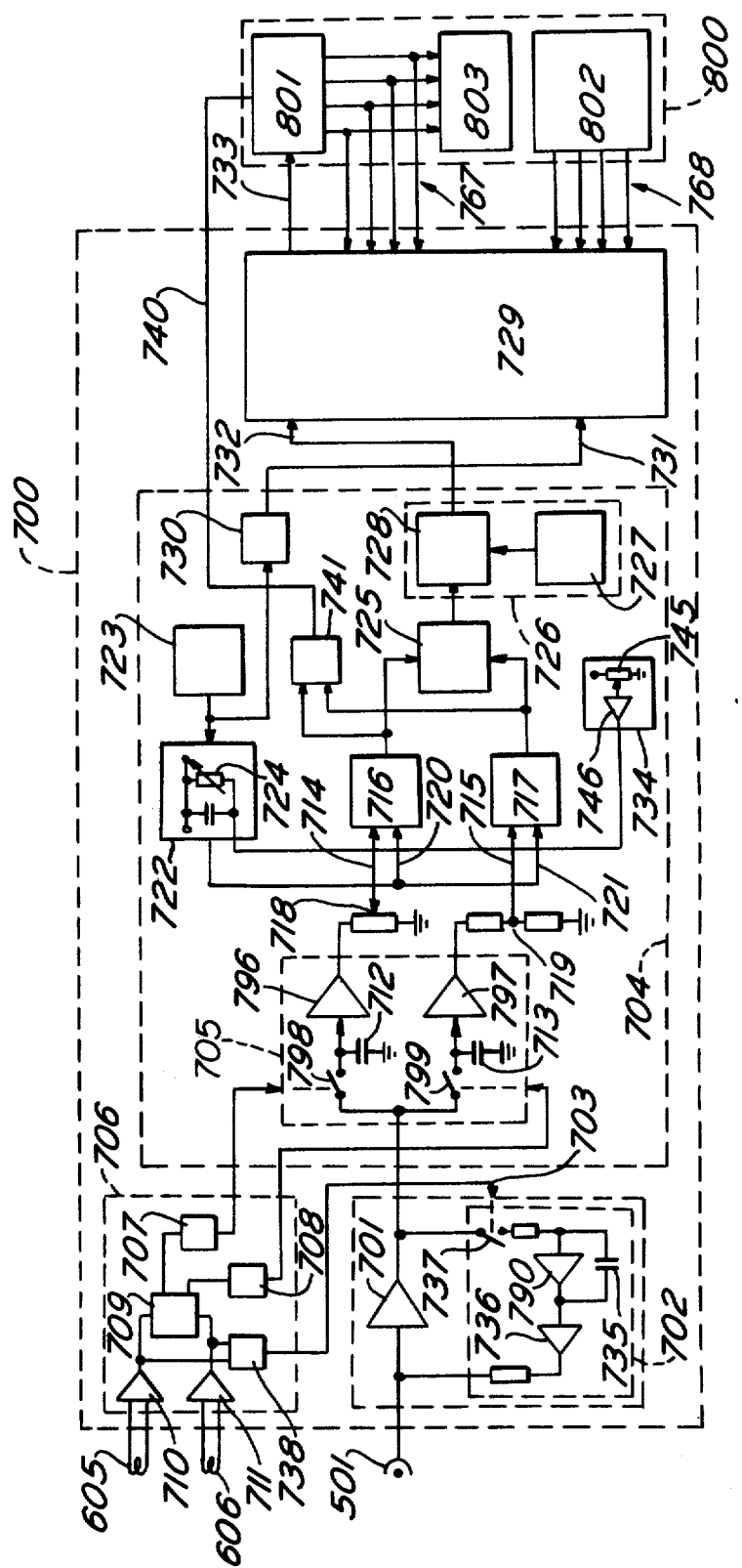
FIG. 3 is a general block diagram of the electronic digital circuit used with the spectrophotometer.

Referring now to the drawings in detail, wherein like numerals indicate like elements, there is shown in FIG. 1 a diagrammatic perspective view of a spectrophotometer which may be used in making the measurements hereinafter described. In particular, such apparatus may be used for making routine concentration measurements which require the determination of the optical density of the sample.

The apparatus illustrated in FIG. 1 is used to measure certain optical properties of the substance by determining the attenuation which occurs in a light beam passing through the substance. The measurement is made by comparing the attenuation produced by a sample of the substance and the attenuation produced by any other substance selected as a reference. This provides a so-called relative measurement of the studied property, i.e., the property of the sample expressed in terms of that reference.

The spectrophotometer outline in FIG. 1 comprises the following main elements:

a. Beam-generating means 100 for producing a beam along a path 101 of collimated light, e.g., white or mixed wavelength light;

b. Monochromator means 200 for selecting from the white or mixed wavelength light beam a monochromatic beam 102 having a selected wavelength, said monochromatic beam being directed along the optical axis 103 of the spectrophotometer;

c. Container means 300 comprising at least one pair of cuvettes of which one serves to receive a reference liquid and the other a liquid sample, the optical absorption of which is to be measured by comparing it with the optical absorption of the reference (when the sample is a solution, the concentration of which is to be measured, the reference is in most cases the solvent, i.e., a "blank" or a "solution" with zero concentration);

d. Scanning means 400 for moving the end portion of said monochromatic beam 102 with respect to the pair of cuvettes, in a direction perpendicular to the axis 103, this relative motion being such that the contents of the two curvettes are optically scanned, i.e., alternately and periodically illuminated by the monochromatic light beam issuing from the monochromator means 200;

e. Light detector means 500 for delivering electrical signals representing the intensities of the beams that have passed through the sample and the reference (or blank), respectively, at the wavelength selected by the means 200;

f. Synchronization signal-generating means 600 for delivering electric signals or pulses that are synchronous with the positions taken, or paths followed, by the scanning portion of the light beam 102, produced by the scanning means 400, this synchronization signal-generating means therefore being mechanically linked to the scanning means 400;

g. An electronic unit 700 connected to the detector means 500 and to the synchronization signal-generating means 600, this unit being arranged for respectively sorting the signals originating from the blank cuvette and the sample cuvette, for calculating the logarithm of the ratio of these signals, i.e., the optical density of the sample expressed in terms of that of the blank, and for digitizing the signal representing said optical density;

h. A control, counter and printer unit 800 for printing at selectable intervals numbers proportional to optical density representing the absorbence or concentration of the sample.

The beam generating means 100 comprises a light source in the form of a lamp 104 which may generate white light, a condensor lens 105, a plane mirror 106, a diaphragm 107 having an aperture in the form of a slit, and a concave spherical mirror 108. This mirror reflects the beam passing through the diaphragm along path 101 onto a grating 201 that is a part of the monochromator means, and reflects the monochromatic beam issuing from the grating along path 109 in the direction of the optical axis 103, thus generating the light beam in the path 102.

The monochromator means 200 comprises a grating plate 201 for selecting from the white beam 101 a monochromatic beam 109, a diaphragm having an aperture in the form of a circular hole 202 and two optical filters 203 and 204 respectively mounted in two openings at the ends of a slide 205 provided with three openings of which the central one 206 is empty. The slide 205 is glidingly mounted in a fixed slideway (not shown) in order to allow transverse movement thereof in the direction of the double arrow 207 so that any one of the three openings can be selectively placed in the path 102 of the monochromatic beam. The grating plate 201 is mounted in a vertical supporting frame 208 rotatable about a vertical axis 209 defined by two pivots 210, 211 engaged in two fixed bearings (not shown). The opening in the frame 208 is greater in the vertical direction than the grating plate 201 itself, thus permitting an adjustment of its vertical position, and providing upper and lower passages 215 and 216 which are, respectively transversed by the beam path 101 and the monochromatic beam path 109. The angular position of the frame 208 and hence the wavelength of the monochromatic beam directed along path 109 are selected by a micrometric screw 212 connected to the frame by a link 213. The micrometric screw is provided with a window 214 in which appears the numeral indicative of the selected wavelength of the monochromatic beam in path 102. The role of the filters 203, 204 is to prevent extraneous parasitic visible light, e.g., stray light or second order diffraction light from the grating plate 201, from impinging on the cuvettes when the wavelength selected by the grating plate 201 lies in the red and near infrared range or in the ultraviolet range; for a wavelength in most of the visible range there is no need for this precaution. Thus the filter 203 has its band width in the UV region and cuts any radiation having a wavelength greater than, say, 420 millimicrons; it is made operative when the beam in path 102 has its selected wavelength in the ultraviolet range, i.e., shorter than, say 400 millimicrons. Similarly, the filter 204 has its band width in the longer wavelength visible and infrared (IR) region and cuts any radiation having a wavelength shorter than, say, 500 millimicrons; it is made operative as soon as the beam along path 102 has its selected wavelength in the red or near IR range.

The container means 300 takes the form of one pair of separate cuvettes such as cuvettes 301 and 302. These cuvettes, of which the one (e.g. cuvette 301) is for receiving a reference liquid (or the "blank") and the other (e.g. the cuvette 302) is for receiving the sample liquid, are both of the flow-through type each having a cylindrical cavity 303 and 304, respectively; these cavities, shown by thin broken lines, have axes which are parallel to the optical axis 103 and are situated in a horizontal plane containing this axis, symmetrically with respect to the axis. The cavities 303 and 304 are connected by flexible tubes 305 and 306, 307 and 308, respectively, to sources and drains for reference (or blank) liquid and for sample liquid, respectively. Conventional pumping means (not shown) may be provided for supplying the liquids to their respective cuvettes. This feeding action is generally intermittent, i.e., the cuvettes are filled, and liquid renewal takes place after a certain time has elapsed, during which the measurement is made. However, continuously operating pumping means may also be used in some cases (e.g., when the liquids are sufficiently homogeneous and so long as the renewal speed is not too high). The front faces (not visible) and the rear faces 309 and 310 of the cuvettes are made optically flat and parallel to each other for preventing any changes in direction of the beam paths through the cuvettes as they enter and leave, the beams impinging perpendicularly on the front faces and emerging perpendicularly from the back faces.

The scanning means 400 consists of a pair of plane-parallel members 401 and 402, such as plates of transparent material, such as of quartz, plastic, or glass. These two transparent members 401 and 402 have rectangular cross-sections, one of the members being mounted adjacent the other in overlapping and crosswise relationship to the other (in superposition as shown) with the front faces of the two members lying in separate planes of a dihedral angle, the vertex 40 of which lies in and extends through both front faces. The back faces also lie in separate planes of a dihedral angle having a vertex 41. Each member has a relatively great "thickness" measured in the direction of the optical axis 103. These members or plates are each plane-parallel, i.e., the front or entrance face 403 (FIG. 2) and the back or exit face 404 of the plate 401 are parallel, as are the entrance face 405 and the exit face 406 (FIG. 2) of the plate 402. Both plates are mounted in a support 407 in such a manner that their planes of incidence (determined by the incident beam 102 and the normal to the entrance plane) are parallel and that the planes of the front or entrance faces of both plates (and consequently the planes of their exit faces) are equally inclined with respect to the incident beam 102 (i.e., the beam bisects their dihedral angle). In the embodiment shown these equal inclinations are $i = 45°$, so that in that case the planes of the entrance faces are mutually perpendicular. The support 407 is held at one end of a lever 408 pivoting about a horizontal fixed axis 409 under the action of an eccentric 410 driven by a motor 411 and acting on the other end of this lever through a roller 412. The assembly of optical plates 401 and 402 thus describes an up and down movement, so that they are inserted alternately in the path 102 of the incident beam. In accordance with the law of refraction of a light beam in a plane-parallel plate, the incident beam is translated in the plane of incidence, the shift thus produced depending on the refractive index of the glass constituting the plate, on the thickness of the plate and on the angle of incidence. Consequently, the outgoing beam is made to jump alternately from one path shifted to the right with respect to the incident beam 102 to another path shifted to the left, both outgoing beams being parallel to each other and to the incident beam 102. For a given angle of incidence, the value of the distance between paths depends on the thickness of the plates. Due to the symmetry, the paths of the outgoing beams are contained in a horizontal plane passing through that of the incident beam 102 and they are symmetrically placed with respect to the optical axis 103. The refractive index of the glass (or other material) of the plates 401, 402 and their thickness are so chosen that the paths coincide with the axes of the cavities 303, 304 of the cuvettes 301, 302, so that the incident (monochromatic) beam is made to jump alternately from one cavity to the other. A lens 415 is provided to improve collimation of the refracted beam before it enters a respective cuvette.

The light detector means 500 comprises essentially a photomultiplier tube 501 coupled with an optical double prism 502. The latter is a symmetrical transparent body of glass, silica, quartz, or plastic material having a plane face arranged at right angles to the two beam paths to receive the light beam in either path perpendicularly and another face formed of two symmetrically arranged planes 51 and 52 which form an obtuse dihedral angle, the linear vertex 50 of which is arranged to lie in a vertical plane in which the axis 103 also lies. The two planes of the dihedral angle make equal angles with a vertical plane through the axis 103. The double prism is situated in the paths of the beams going out of the container means 300 and is placed in such a position that each refracted beam proceeds through the same thickness of the prism which refracts them back toward the axis 103 and directs them to the same point 503 on the photocathode of the multiplier 501. With such an arrangement, the beam issuing from the blank (reference) cuvette 301 and the beam issuing from the sample cuvette 302 alternately excites the phototube 501 and, owing to the fact that they impinge on the same point 503 on the photocathode, the sensitivity of the photoelectric conversion is the same for both. Two diaphragm plates 504 and 505, each provided with two apertures, such as the holes 506 and 507 in the plate 505, are placed one on each end of the container means 300, the holes being in alignment with the axes of the cuvette cavities 303 and 304 respectively. These diaphragms are provided in order to prevent parasitic light arriving from the side from falling on the phototube 501, so that the signal delivered by the latter is attributable only to one of the refracted monochromatic beams in either path derived from the monochromatic beam in path 102. The multiplier phototube 501 is electrically connected to the electronic unit 700, this connection being depicted by a line 508.

The synchronization signal-generating means 600 is intended for delivering signals indicating on which of the paths the scanning beam lies. It comprises a disc 601 driven by the same shaft 602 as the eccentric 410 and provided with two permanent magnets 603 and 604 situated at 90° to each other. In front of the disc 601 two fixed coils 605, 606 are arranged in diametrically opposite positions with respect to the common trajectory of the magnets 603, 604 and at a distance from the axis 607 of the disc 601 equal to that of these magnets. With this arrangement, each coil delivers an electric signal or pulse each time a magnet passes in front of it during rotation of the eccentric 410. The angular position of the coils with respect to the axis 607 and those of the magnets with respect to the axis of the eccentric 410 are so chosen that four pulses are generated at each rotation of the latter, two of them corresponding to the "dead-center" points, i.e., the extreme positions of the angular movement of the lever 408 and the two other pulses being in quadrature with the first one. Both coils are electrically connected to the electronic unit 700 as diagrammatically represented by lines 608 and 609 in FIG. 1.

The beam-generating means 100, monochromator means 200, container means 300, scanning means 400, light detector means 500 and synchronization signal-generating means 600 are each exemplary and it should be understood that other known apparatus for performing one or more of these functions can be used in their place as desired.

The electronic unit 700 is represented in detail in the block diagram shown in FIG. 3. It comprises an input amplifier 701 connected to the tube 501, preferably of the photomultiplier type, and is provided with a feedback circuit 702 having an auxiliary input 703 derived from circuit 738 for dark current compensation as hereinafter described. Input amplifier 701 is connected to a linear to digital logarithmic ratio converter designated generally by dashed line 704. The linear to digital ratio converter 704 generates a digital output proportional to the logarithm of the ratio of the sample to blank transmission.

As illustrated herein, linear to logarithmic ratio converter 704 includes a synchronous demodulator denoted by dashed line 705. Synchronous demodulator 705 is controlled by signals generated by a synchronization pulse derived from the pulse generator indicated by dashed line 706. Pulse generator 706 comprises two monostable multivibrators 707 and 708 which generate an output as determined by the set-reset flip-flop 709. Flip-flop 709 assumes one state or another depending upon the pulses delivered to it by coils 605 and 606 shown in FIG. 1 to be part of the synchronization signal-generating means 600. The pulses delivered by pick-up coils 605 and 606 are amplified by amplifiers 710 and 711. Clearly, a signal will be present at the output of either multivibrator 707 or 708 depending upon the pulses present in pick-up coil 605 and 606 and hence the transitions of flip-flop 709. The output of multivibrators 707 and 708 control controls whether switch 798 or switch 799 is closed. Switches 798 and 799 are shown schematically for the purpose of simplifying the explanation herein. It should be understood that they may take the form of an electronic switch or an electromechanical device such as a reed switch. The purpose of switches 798 and 799 under the control of synchronization pulse generator 706 is to connect the output of input amplifier 701 to either capacitor 712 or capacitor 713 in proper synchronization with the position of the beam passing through either cuvette 301 or cuvette 302.

Wave form A in FIG. 7 represents the current delivered by the input amplifier 701 as a function of time. This wave form shows alternately higher and lower peaks, the high peaks having an amplitude $I_b$ and the low peaks having an amplitude $I_s$ which correspond, respectively, to the intensity of the light beam 102 after passage through the blank cuvette 302 and to the intensity of the light after passage of the same beam through the sample cuvette 301.

Capacitors 712 and 713 may be referred to as measuring capacitors. They are charged to voltages, $U_b$ (blank) and $U_s$ (sample) respectively, that are proportional to the blank and sample within the cuvettes 301 and 302. The voltages $U_b$ and $U_s$, which are porportional to currents $I_b$ and $I_s$, are buffered by amplifiers 797 and 796. The output of amplifier 796 is connected to potentiometer 718 and the output of amplifier 797 is connected to voltage divider 719 as shown. The voltage signal derived from potentiometer 718 is connected to one input of comparator 716 by conductor 714 and the voltage signal derived from voltage divider 719 is connected to one input of the comparator 717 by conductor 715. The other input of comparators 716 and 717 is a series of exponentially decaying pulses generated by exponential pulse generator 722. Such a series of exponential pulses is illustrated as wave form C in FIG. 7. As shown, exponential pulse generator 722 includes a resistance-capacitance (R-C) circuit which charges and discharges to provide an exponential pulse as determined by oscillator 723 operating as a clock. The clock pulses are shown as wave form B in FIG. 7. Appropriate switching circuitry (not shown) is provided for charging and discharging the R-C circuit. The peak voltage $U_o$ of each exponential pulse is determined by appropriate setting of variable resistor 724.

It is the function of each comparator 716 and 717 to generate a rectangular pulse having a time duration that is proportional to RC multiplied by the logarithm of the ratio between the voltage levels on conductors 714 and 715 and $U_o$ which ratios are $U_b/U_o$ and $U_s/U_o$ respectively; $RC|\text{Log }(U_b/U_o)|$ and $RC|\text{LOG }(U_s/U_o)|$, i.e., the vertical bars indicate the "absolute" value in the algebraic sense. Each comparator therefore functions as a "linear-to-logarithmic converter". This works as follows. When clock 723 initiates the discharge of the capacitor in exponential pulse generator 722, a first signal which may be voltage $U_b$ is present at comparator 716 via conductor 714. A second signal which may be voltage $U_s$ is present at comparator 717 via conductor 715. Comparators 716 and 717 compare the voltages $U_b$ and $U_s$ across the measuring capacitors 712 and 713 to the exponential pulses generated by pulse generator 722 and illustrated in wave form C. The pulses shown as wave forms D and E illustrate the output of comparators 716 and 717. The pulses shown in wave form D have a length $\Delta t_b$ proportional to the logarithm of the ratio $U_o/U_b$ and the pulses shown in wave form E have a length $\Delta t_s$ proportional to the logarithm of the ratio $U_o/U_s$. Thus, comparator 716 generates an output to subtracting circuit 725 which may be an exclusive OR gate. As long as the signal $U_b$ on conductor 714 is less than the exponentially decaying signal on conductor 721, comparator 716 generates an output signal. Comparator 717 produces an output as long as $U_s$ is less than the exponentially decaying signal. This condition continues until the exponentially decaying signal is equal to voltage $U_s$ some time later. Gate 725 therefore produces an output only when the output of gate 717 is "high" and the output of gate 716 is "low" or vice-versa. When both are high or both are low, there is no output. Thus, the output of gate 725 is a time duration signal. Moreover, the length of the duration of the output of gate 725 is proportional to the difference between the signals applied to its input. Thus, circuit 725 acts as a subtracting circuit and the output thereof is a square wave pulse $\Delta t$ as shown in wave form F of FIG. 7. The length of the pulse $\Delta t$ will be the difference between the length of the pulse $\Delta t_b$ and $\Delta t_s$ in wave forms D and E of FIG. 7. The length of the pulse generated by gate 725 is therefore proportional to RC log $(U_s/U_b)$. Since RC is a constant, the output is proportional to the logarithm of the ratio or $U_s/U_b$. Consequently, the pulse length of the output of gate 725 is an analog representation of the relative measure of the attenuation of the scanning beam (at the selected wave length) passing through the sample and blank cuvettes. Stated otherwise, this relative measure is the value of the attenuation caused by the sample liquid with respect to the attenuation caused by the blank liquid.

The time duration pulse generated by gate 725 is digitalized by circuit 726 which may comprise a quartz oscillator 727 and an AND gate 728 connected so that the pulse generated by gate 725 gates the pulses generated by oscillator 727 to the output of gate 728 and onto conductor 732. The train of pulses ($f\Delta t$ where $f$ is frequency of oscillator 727) that appears at the output of gate 728 therefore contain a number of pulses proportional to the length of the time duration pulse generated by gate 725. The trains of pulses are shown in wave form G in FIG. 7. Each of these trains contains a number of pulses that is a digital measure of the logarithm of the ratio $U_a/U_b$.

If desired, the output of the linear to logarithmic converter 704 could be fed directly to decimal counter 801 in the control and display unit 800. This would therefore read out a value proportional to the absorbence.

In accordance with the present invention, the pulse train is transmitted first to the drift correcting circuit 729 and then to display unit 800.

Drift correcting circuit 729 is illustrated in detail in FIG. 4. As previously explained, the function of the drift correcting circuits is to provide a drift correction factor. This factor $k$ modifies subsequently measured values $f\Delta t$ to provide $kf\Delta t$. Circuit 729 also indicates when the present value of the attenuation has become greater or lower than a preset limit. Drift correction works in the alternative to routine measurements and is initiated by filling the sample cuvette 301 with a standard substance which may have undergone a drift such as by way of example, chemical drift. The drift correction cycle is triggered by means of switch 762.

Drift correcting circuit 729 includes a multiplier 751. The input of multiplier 751 is the pulse train generated by the output of gate 728 (wave form G, FIG. 7). As shown, the output of multiplier 751 is conducted over conductor 733 directly to counter 801 in display unit 800. This output is itself a pulse train (wave form H, FIG. 7) whose value is determined by the multiplying factor $k$ stored in up/down counter 752. Factor $k$ is less than one. Up/down counter 752 counts pulses generated by pulse generator 753 and it counts either up or down according to the result of a comparison made by digital comparator 754. Comparator 754 has two digital decimal inputs via conductors 767 and conductors 768. As shown in FIG. 3, the digital input via conductors 767 is the decimal count made by counter 801. It will be recalled that this count corresponds to the measured attenuation or concentration of the selected standard liquid. The digital input via conductors 768 is a preselected decimal number. This number is preferably the value of the attenuation or concentration of the standard sample before undergoing drift which was used for initial calibration of the spectrophotometer and it is stored by presetting the programmable memory of digital register 802 (such as by means of a thumb wheel switch provided on the control panel of display unit 800). Up/down counter 752 counts up, does not count, or counts down according to whether the digital number inputed to comparator 754 via conductors 767 is greater than, equal to, or lower than the value stored in register 802 and conducted to comparator 754 via conductors 768. The logical output state of comparator 754 is conducted to counter 752 via conductors 755 and 756.

Counter 752 determines the factor by which multiplier 751 multiplies the number of pulses contained in the pulse train derived from gate 728 via conductor 732. Since counter 752 is an up/down counter, the value of this multiplying factor will change until the measured value derived from decimal counter 801 is equal to the preset value derived from digital register 802. Equality between these two values is defined by identical logical outputs from comparator 754 on conductors 755, 756 in which case the up/down counter 752 neither counts up nor counts down.

The time required to reach equality between the measured value of attenuation and the preset value of attenuation is shortened according to the present invention by allowing the up/down counter 752 to modify its contents in a stepwise manner in greater steps at the beginning of the drift correction and then in steps of successively reduced magnitude as the drift correction proceeds. Stated otherwise, each time the result of the comparison made by digital comparator 754 passes through equality, thus effecting a reversal of the sense of counting in the up/down counter 752, there is a reduction in the magnitude of the variation of the value stored in the counter.

Figure 5:
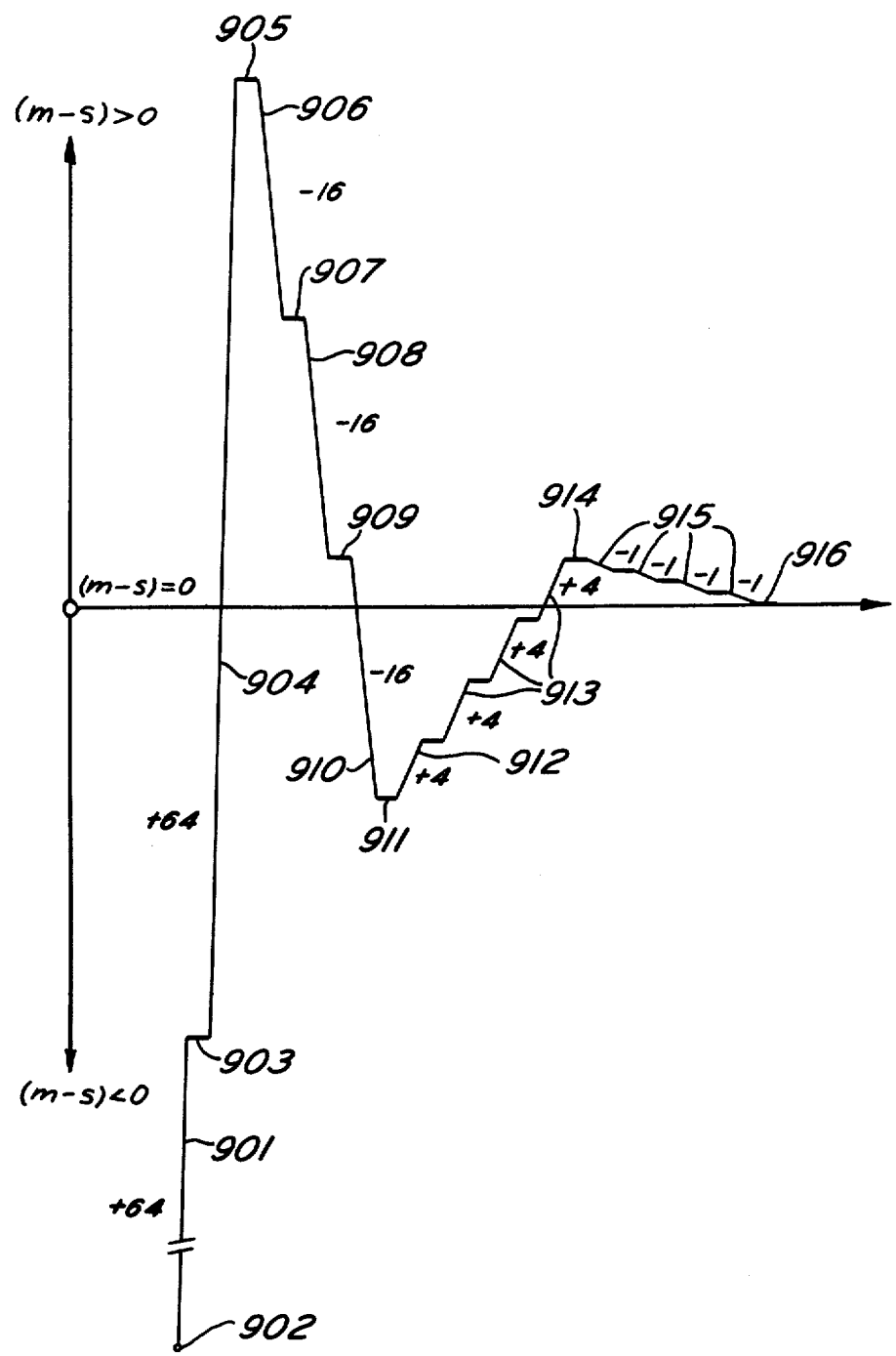
FIG. 5 is a graph illustrating the drift correction strategy used by the drift correction circuit of FIG. 4.

This drift correction strategy is illustrated in FIG. 5. By way of example for purposes of explanation, but not limitation, the first correcting step 901 is assumed to be 64 pulses. It is also assumed by way of example that the measure $m$ represented by the output of the decimal counter 801 is, at the correction starting point 902, less than the standard quantity or value $s$ represented by the decimal number stored in the digital register 802. In other words, $(m - s)$ is less than zero. The first correction step 901 is to change the value of the contents of the up/down counter 752 and since $(m - s)$ is less than zero, this change should be an increase in value. As hereinafter explained, the up/down counter 752 counts up 64 pulses. A second comparison is then made at step 903 which once again gives a result $(m - s)$ less than zero. A second correction of the up/down counter 752 is therefore necessary and the direction of change is the same, i.e., an increase in its content. The counter 752 therefore again counts up 64 pulses. This second change is represented by the graph line 904. A third comparison of the value $(m - s)$ at the step 905 gives the result $(m - s)$ greater than zero, thus indicating that further correction is necessary but in the reverse direction, i.e., in the form of a decrease of the contents of the up/down counter 752. As previously explained, the drift correction strategy requires that the amount of change in the content of the up/down counter be reduced each time the sense of direction of change is reversed, a condition which occurs whenever the value $(m - s)$ passes through equality. By way of example, the strategy consists in reducing by a factor of four the magnitude of the subsequent steps. The up/down counter 752 is therefore allowed to count down 16 pulses (64 divided by four), as represented by the graph line 906. A further check of the value $(m - s)$ takes place at step 907, giving the result $(m - s)$ greater than zero. This therefore indicates that a new correction in the same direction as the preceding step is required. This is illustrated by the graph line 908. A further check of the value $(m - s)$ at step 909 once again indicates that $(m - s)$ is still greater than zero and still calls for a correction in the same direction. This is indicated by the graph line 910. A check or comparison at step 911, however, now indicates that the result $(m - s)$ is less than zero. Accordingly, the next correction must therefore be in the opposite direction and its magnitude is reduced by a further factor of four. Accordingly, the up/down counter 752 is now made to count up four pulses (16 divided by four) as indicated by graph line 912. This is repeated as indicated by graph lines 913 until a comparison at step 914 indicates that $(m - s)$ is greater than zero. The up/down counter 752 is then made to reverse direction and to count down by a number of pulses that are further reduced by a factor of four. Accordingly, it counts down by a value of one (four divided by four) making a comparison at each step as indicated by graph lines 915. This is repeated until a comparison at step 916 finally indicates that the value ($m - s$) is equal to zero. This indicates that the drift correction has been made and should be terminated. All subsequent pulse trains passing through multiplier 751 will therefore be multiplied by a now fixed factor $k$ represented by the final number stored in the up/down counter 752. In other words, all further measurements of samples in cuvette 301 will be corrected by a factor $k$ as thus determined.

The procedure thus described provides a rapid method for making the drift correction, particularly, in comparison to a procedure which would make unit step corrections. Obviously, the program for the strategy need not start at 64 steps and be reduced by a factor of four. Other initial steps values and reduction factors can be chosen as desired.

Obviously, the foregoing procedure requires the apparatus to adjust the multiplying factor stored in the up/down counter 752. For this purpose, a pulse group generator 753 is controlled by the programmer indicated by the dashed line 757 in FIG. 4. Programmer 757 includes an auxiliary counter 758 connected to the two outputs 755 and 756 of the digital comparator 754 through a pulse generating circuit 759. Pulse generating circuit 759 generates one pulse each time the outputs on conductors 755 and 756 reverse their logical state; that is, when one becomes high and the other becomes low or vice versa. This is an indication that ($m - s$) has shifted from less than zero to greater than zero or vice versa. Of course, when the logical output on conductors 755 and 756 is the same (both high or both low), equality has been reached. Counter 758 counts the number of pulses received from pulse generator 759 and uses that count to control the number of pulses contained in the pulse group generated by pulse group generator 753. Pulse group generator 753 is triggered (that is, generates a pulse) by the clock pulses derived from the output of clock 723 (FIG. 3). These clock pulses, however, are time delayed by delaying circuit 730 before they are placed on conductor 731 and delivered to gate 760 whose function is described below. Delaying circuit 730 may be any conventional means for accomplishing this purpose, such as a shift register and appropriate control circuitry. Delaying circuit 730 is set to delay the arrival of the clock pulses at gate 760 by an amount of time equal to the maximum duration of the rectangular pulses generated by comparators 716 and 717. This maximum duration corresponds to the lowest level signal delivered by the photomultiplier tube 501; that is, the greatest absorbence that can be measured by the spectrophotometer.

The delayed clock pulses are inhibited from delivery to the pulse generator 753 by AND gate 760 which in turn is controlled by set-reset flip-flop 761. Set-reset flip-flop 761 is arranged to open gate 760 only when its input S (set) has been excited by manually actuated switch 762. Stated otherwise, the closing of switch 762 initiates the drift correction procedure. Otherwise, the delayed clock puses are not delivered to the pulse generator 753 and the count in up/down counter 752 remains fixed.

The output of set-reset flop-flop 761 is further connected to the input R (reset) of the auxiliary counter 758 and is used to maintain this counter in its "zero" state as long as no drift correction is required, i.e., as long as gate 760 is closed. When drift correction is initiated by closing switch 762, auxiliary counter 758 commences to count the pulses generated by pulse generator 759. In addition, gate 760 is opened and the next delayed clock pulse triggers the pulse generator 753.

When auxiliary counter 758 is in its "zero" state, pulse generator 753 generates sixty-four correction pulses when it receives a triggering pulse (delayed clock pulse) from the gate 760. These correction pulses are either added to or subtracted from the pre-existing contents of the up/down counter 752, according to the state of excitation on conductors 755 and 756. It will be recalled that the state of conductors 755 and 756 as determined by the digital comparator 754 determines whether up/down counter 752 counts up or counts down. Whenever the state of excitation on conductors 755 and 756 reverses, thus indicating that ($m - s$) has passed through zero or $m$ and $s$ through equality, the auxiliary counter 758 changes from its "zero" state to its "one" state which is to say it counts one pulse from the pulse generator 759. At this point, pulse generator 753, being under the control of auxiliary counter 758, will now generate ony 16 pulses (64 divided by four). According to the strategy outined above, pulse generator 753 will continue to generate 16 pulses each time it receives a delayed clock pulse through gate 760. This takes place until the further reversal of the excitation state of conductors 755 and 756 indicates that the digital comparator 754 has determined that $m$ and $s$ have again passed through equality. This new determination causes auxiliary counter 758 to count a pulse from pulse generator 759 and change to its "two" state. In this state, pulse generator 758 allows the pulse generator 753 to generate only four (16 divided by four) pulses at each occurrence of a delayed clock pulse. This procedure continues until at the next reversal of the excitation state on conductors 755 and 756, the counter 758 changes to its "three" state in which once again the pulses generated by pulse group generator 753 are reduced by a factor of four so that it now generates only one pulse as determined by the delayed clock pulses through AND gate 760.

The input R (reset) of set-reset flip-flop 761 is derived from AND gate 763 which in turn is connected to the conductors 755 and 756. AND gate 763 delivers a resetting pulse only when the excitation state on the conductors 755 and 756 is the same; i.e., when the value ($m - s$) has reached zero. This indicates that $m$ and $s$ are equals and, therefore, that the drift correction has been completed. When equality is indicated by the digital comparator 754, the set-reset flip-flop 761 changes to the reset state and consequently gate 760 is closed so that triggering of the pulse group generator 753 by the delayed clock pulses is inhibited. At the same time, a reset pulse is delivered to auxiliary counter 758 and it resets to its "zero" state, thereby becoming ready for a subsequent drift correction. The existing content of the up/down counter is now fixed and stored therein. Accordingly, the number of pulses contained in each subsequent pulse train (wave form G, FIG. 7) appearing on the output of digitalizing circuit 726 is multiplied by that stored number in multiplier 751. In other words, the final numeral value stored in up/down counter 752 becomes the fixed multiplying factor in multiplier 751 thereby generating the wave form H of FIG. 7. As indicated, this final numerical factor $k$ is less than one.

Switch 764 provides a means for inputting a load L into the up/down counter 752. Counter 752 is loaded with an initial number that corresponds approximately to the middle of its counting range. This counter is further provided with an auxiliary output 765 connected to a threshold detector 766 whose function is to determine when the amount of drift correction has passed through a certain preset limit to thus sound an alarm.

Threshold detector, as stated, stores the amount permitted for drift correction and indicates when this correction becomes greater than this amount.

Figure 6:
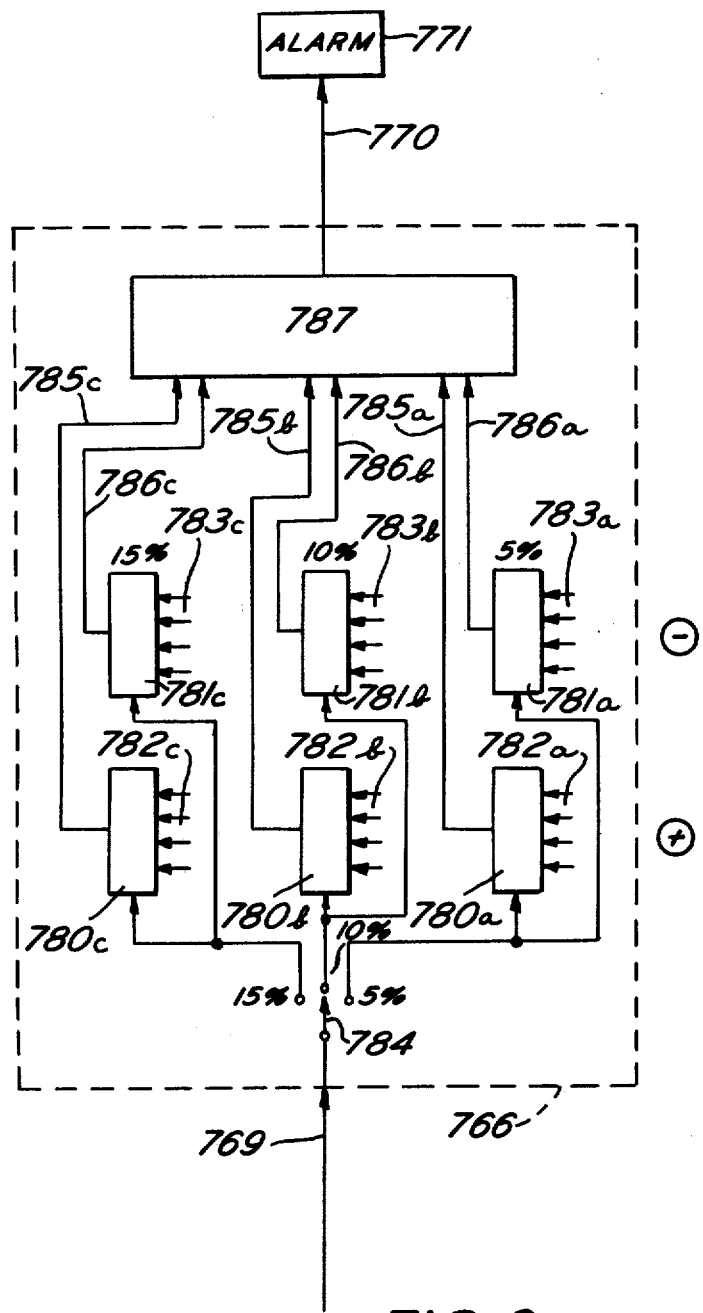
FIG. 6 is a more detailed block diagram of a threshold circuit used with the drift correcting circuit of FIG. 4.

Threshold detector 766 is shown in FIG. 6 and it comprises two groups of digital comparators. The first group of digital comparators is made up of comparators 780a, 780b and 780c. The second group of comparators is made up of comparators 781a, 781b and 781c. The comparators are well known circuit devices and therefore need not be described in detail. Each comparator is preset to a given value equal to the number initially loaded into the up/down counter 752 increased or decreased by a given percentage. The comparators of the first group (780) are increased by the given percentage and the comparators of the second group (781) are decreased by the given percentage. For example, the comparator 780a is preset to the number loaded in up/down counter 752 increased by 5%, the comparator 780b is preset to the aforesaid number increased by 10% and the comparator 780c is preset to the aforesaid number increased by 15%. In the same way, the comparator 781a is preset to the number initially loaded into up/down counter 752 decreased by 5%. The comparator 781b is preset to the initial number decreased by 10% and the comparator 781c is preset to the initial number decreased by 15%. These preset values are entered into the comparator of group 780 through conductors 782a, 782b and 782c connected to an appropriate signal generating circuit (not shown). In a like manner, the preset values are introduced into the comparators of group 781 through conductors 783a, 783b and 783c also connected to an appropriate signal generator (not shown) for generating the correct value.

The input to threshold detector 766 through conductor 769 is made through a selector switch 784. Switch 784 is manually controlled and permits the operator to select either a 5%, 10% or 15% threshold limit with respect to the count initially set into up/down counter 752. It should be noted that this is a limit on the multiplying factor, not on the actual absorbence or concentration read-out but the result is mathematically the same.

The outputs of the 5% comparators 780a and 781a are taken through conductors 785a and 786a respectively to the input of an OR gate 787. The outputs of comparators 780b and 781b are taken through conductors 785b and 786b, respectively, to the input of OR gate 787. The outputs of comparators 780c and 781c are taken through conductors 785c and 786c, respectively, to the input of OR gate 787. By means of the selector switch 784, only two of the aforesaid comparator outputs are operative at any one time. The logical output of OR gate 787 is connected through conductor 770 to an appropriate alarm 771 which may take any conventional form such as a warning lamp, a bell, or the like.

Since the input 769 to any of the paired comparators is derived from the auxiliary output 765 of the up/down counter 752, and each of said comparators stores a preloaded value equal to the value initially loaded into the up/down counter 752 increased or decreased by an appropriate percentage, then such comparators will detect when the value stored in the up/down counter 752 exceeds that percentage. In the example given, the operator can select 5%, 10% or 15% as desired. Of course, other percentages can be used. Each of the paired comparators will have the same logical output until the value in the up/down counter 752 exceeds the selected percentage. At that point, the logical state of one of the comparators will change and hence an output will be generated by the OR gate 787 to trigger the alarm 771.

Since the up/down counter 752 need not be reset to its initial or starting state each time a drift correction is made, such up/down counter 752 serves to accumulate the amount of drift from drift adjustment to drift adjustment until such times as the amount of such drift exceeds the selected percentage. It is expected that the operator of the spectrophotometer will periodically place a standard sample in the cuvette 301 to determine the amount of drift.

The count made by the decimal counter 801 is displayed by a conventional output display 803 of any commercially available type. Moreover, the output of counter 801 can be coupled to a printer (not shown) for printing out the spectrophotometric measurement in appropriate numerical form.

The transfer into the output display apparatus 803 of the data of the count stored in decimal counter 801 is controlled by a data transfer latch signal generated on conductor 740. The data transfer latch signal is derived from a trigger circuit 741 whose inputs are taken directly from the outputs of comparators 716 and 717. Trigger circuit 741 may appropriately be a NAND gate or other logic circuitry which generates a signal only when it no longer receives signals from the comparators 716 and 717. Stated otherwise, trigger circuit 741 generates the data transfer latch signal when it receives the trailing edge of the longest pulse generated by the comparators 716 and 717.

It is well known that any photomultiplier tube such as tube 501 generates a current even when there is no light incident upon it. This is known as the "dark current" output of the photomultiplier tube, and circuitry must be provided to compensate for it. The dark current compensating circuit is shown within the dashed lines 702 in FIG. 3 and is basically a feedback circuit that samples the dark current signal output of amplifier 701 during the time period when no light is passing through the cuvettes. Appropriate adjustments based upon the measured and sampled dark current are made to correct for its value. The sampling of dark current is synchronized to occur between the time when the light is passing from one cuvette to the other by switch 737. This switch is shown as a mechanical switch but it should be understood that this is for purposes of illustration only. It may also be an electronic switch such as a controlled transistor. Switch 737 is controlled by a circuit 738 triggered by the synchronization signals delivered by the amplifiers 710 and 711.

Dark current compensation is made by integrating the output of amplifier 701 using the capacitor 735 connected across amplifier 790. The integral of this signal taken during the sampling period is fed to the input of amplifier 736 which in turn is coupled back to the input of amplifier 701. This integrated compensating current fed back to amplifier 701 has a polarity that is opposite to the dark current. As a result, the dark current is nullified.

The present invention may be embodied in other specific forms without departing from the spirit or essential attributes thereof and, accordingly, reference should be made to the appended claims, rather than to the foregoing specification as indicating the scope of the invention.

We claim:

1. Apparatus for correcting for drift in substances being measured in a digital spectrophotometer comprising:
    means for adjusting the spectrophotometric digital output to correct for drift in said substances;
    said adjusting means including means to multiply said digital output by a variable factor to thereby vary the number of pulses in said spectrophotometric digital output; and
    means to vary said factor so that the adjusted digital output of a standard sample that has undergone drift is equal to a preselected standard.

2. Apparatus in accordance with claim 1 including means to signal when the amount of adjustment exceeds a predetermined limit.

3. Apparatus in accordance with claim 2 wherein said means to signal when the amount of adjustment means exceeds a predetermined limit includes means to evaluate the amount of variation in said factor and signal when the amount of said variation exceeds a predetermined limit.

4. Apparatus for correcting drift in accordance with claim 1 wherein said means to vary said factor include means to make the variation in successively reduced steps to bring the adjusted digital output into equality with the preselected standard.

5. Apparatus for correcting for drift in substances being measured in a digital spectrophotometer comprising:
    means for adjusting the spectrophotometric digital output to correct for drift in said substances;
    said adjusting means including means to multiply said digital output by a variable factor to thereby vary the number of pulses in said spectrophotometric digital output;
    means to vary said factor to correct for a present value of drift;
    said means to vary said factor including means to compare said digital output to a preselected standard; and
    means responsive to said comparison means to effect an adjustment in said factor.

6. Apparatus for correcting for drift in accordance with claim 5 wherein said means to multiply said output by a variable factor comprises a digital multiplier and an up/down counter connected to said multiplier.

7. Apparatus for correcting for drift in accordance with claim 6 wherein said means responsive to said comparison means causes said up/down counter to count up whenever said preselected standard is higher than said digital output and causes said up/down counter to count down whenever said preselected standard is lower than said digital output.

8. Apparatus for correcting for drift in accordance with claim 7 further including means for causing said up/down counter to count in successively reduced steps.

9. In a digital spectrophotometric measuring system including a digital spectrophotometric measuring apparatus having a means for representing the results of each measurement in the form of at least one pulse train containing a number of pulses and wherein the number of pulses is proportional to the measured value, the improvement comprising:
    means for adjusting the output of said spectrophotometric apparatus to compensate for drift in the substance to be measured;
    said adjusting means including means to multiply said output by a variable factor;
    means to compare the digital output representing a standard sample of said substance that has undergone drift with a preselected standard, and
    means responsive to said comparison to vary said factor.

10. Apparatus for correcting for drift in substances being measured in a spectrophotometer comprising:
    programmable memory means for storing a quantity representing a standard sample of the substance to be measured in said spectrophotometer before said standard sample has undergone drift;
    input means adapted to be connected to the output of said spectrophotometer for receiving a first signal from said spectrophotometer which first signal represents a standard sample of the substance to be measured in said spectrophotometer which standard sample may have undergone drift;
    means for multiplying said first signal by a variable factor;
    means for varying said factor to correct said first signal to said stored quantity, said varying means comprising means for comparing the output of said multiplier means with said stored quantity, means for increasing said factor in a stepwise manner whenever said multiplier output is less than said stored quantity, means for decreasing said factor in a stepwise manner whenever said multiplier output is greater than said stored quantity and means for reducing the magnitude of the steps whenever said output and said stored quantity passed through equality during the next previous increasing or decreasing step, and
    means for memorizing the value of said factor needed to correct said first signal to said stored quantity whereby any subsequently received signal can be multiplied by the same said value.

11. Apparatus for correcting for drift as claimed in claim 10 wherein said means for multiplying said first signal by a variable factor comprises a digital multiplier and an up/down counter connected to said multiplier.

12. In a spectrophotometric measuring system, including a spectrophotometer having a means for representing the result of each measurement in logarithmic form, the improvement comprising a means for correcting for drift in substances being measured in said spectrophotometer; said drift correcting means comprising: programmable memory means for storing a quantity representing a standard sample of the substance to be measured in said spectrophotometer before said standard sample has undergone drift;
    means connected to the output of said spectrophotometer for receiving a first signal from said spectrophotometer which first signal represents a standard sample of the substance to be measured in said spectrophotometer which standard sample may have undergone drift;
    means for multiplying said first signal by a variable factor;
    means for varying said factor to correct said first signal to said stored quantity, said varying means comprising means for comparing the output of said multiplier means with said stored quantity, means for increasing said factor in a stepwise manner whenever said multiplier output is less than said stored quantity, means for decreasing said factor in a stepwise manner whenever said multiplier output is greater than said stored quantity and means for reducing the magnitude of the steps whenever said output and said stored quantity passed through equality during the next previous increasing or decreasing step, and means for memorizing the value of said factor needed to correct said first signal to said stored quantity whereby any subsequently received signal can be multiplied by the same said value.

13. In a spectrophotometric measuring system as claimed in claim 12 wherein said means for multiplying said first signal by a variable factor comprises a digital multiplier and an up/down counter connected to said multiplier.

* * * * *